United States Patent Office 3,512,943
Patented May 19, 1970

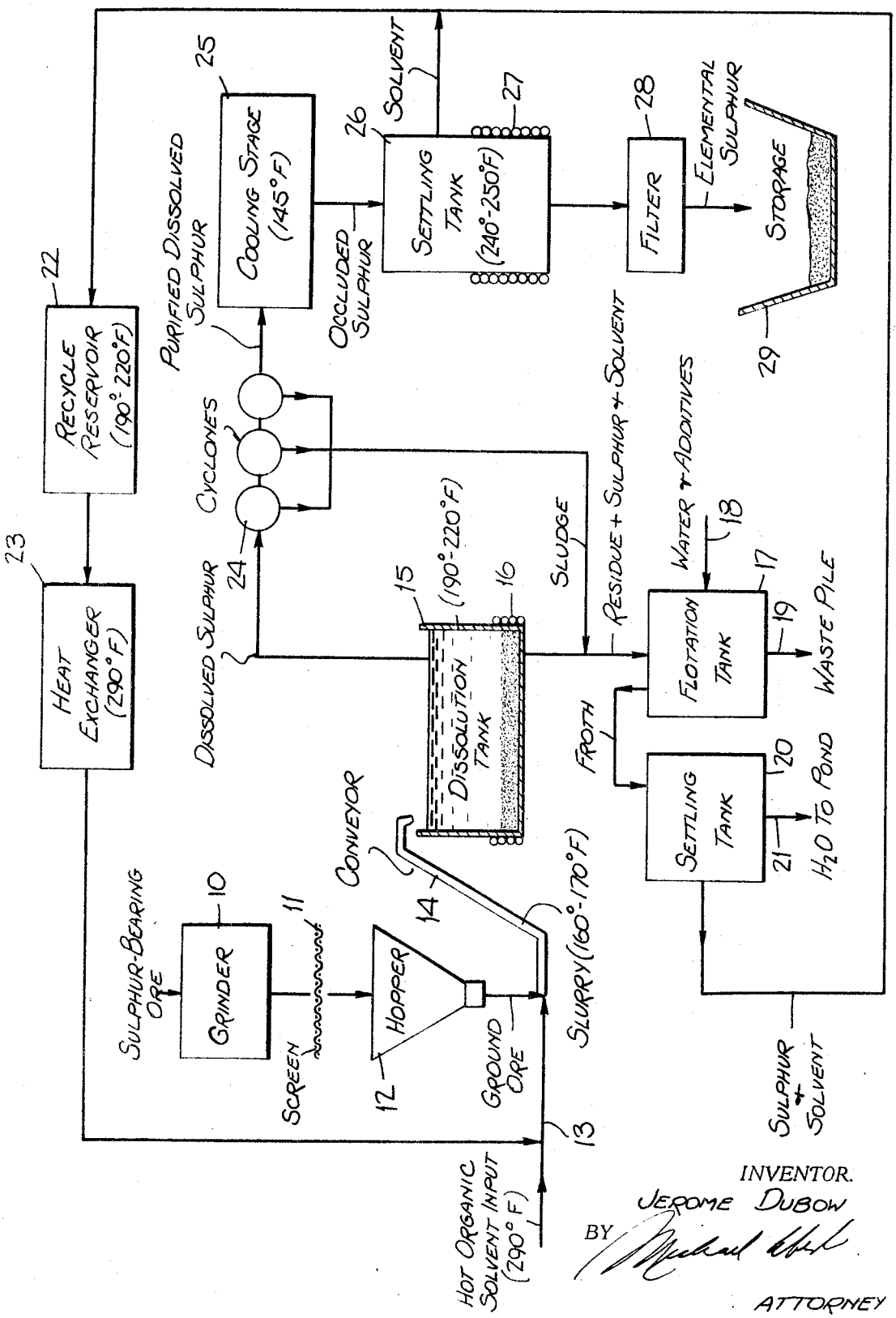

3,512,943
SULFUR EXTRACTION APPARATUS INCLUDING RESIDUE TREATING FLOTATION MEANS
Jerome Dubow, Port Washington, N.Y., assignor to Dubow Chemical Corporation, Valley Stream, N.Y., a corporation of New York
Filed June 13, 1967, Ser. No. 645,728
Int. Cl. B01d 9/02, 11/02
U.S. Cl. 23—267                               7 Claims

ABSTRACT OF THE DISCLOSURE

A technique for extracting sulphur in elemental form from sulphur-bearing ore and the like, wherein the sulphur-bearing material is first treated in a dissolution zone with an organic solvent at an intermediate temperature dissolving the sulphur to produce a pregnant liquor as well as a solid residue, which pregnant liquor is transferred to a sub-dissolution zone for treatment at a low temperature at which occluded sulphur is produced, the occluded sulphur being transferred to a phase-separation zone for treatment at a high temperature at which elemental sulphur is recovered.

---

This application is an improvement over the invention disclosed in my copending application Ser. No. 584,743, filed Oct. 6, 1966, now U.S. Pat. 3,440,026 entitled "Solvent Extraction of Elemental Sulphur from Sulphur-Bearing Materials."

This invention relates generally to a technique for the solvent extraction of sulphur from sulphur-bearing ores and other materials containing sulphur in elemental form, and more particularly to a system, in which sulphur dissolved in an organic solvent is recovered by phase separation.

It is known to recover elemental sulphur from sulphur-bearing ores by selectively leaching the sulphur-bearing material with a hot organic liquid solvent, such as kerosene and similar hydrocarbon solvents. The sulphur dissolved by the hot liquid is recovered by cooling the liquid to a temperature at which sulphur crystallizes out, the sulphur crystals being thereafter separated from the cooled liquid.

A method utilizing the crystallization technique is described in U.S. Pat. No. 3,063,817. In the method disclosed in this patent, sulphur-containing ore in the comminuted condition is preheated to a temperature below the melting point of sulphur and then mixed with an aliphatic hydrocarbon, the sulphur being extracted from the ore at a temperature range between 85° C. to 132° C. According to this patent, the upper temperature limit of 132° C. is extremely important, for when this temperature is exceeded, liquid sulphur is produced which is not absorbed by the solvent and which interferes with the efficiency of reaction. It tends to collect at the bottom parts of the apparatus, it solidifies and becomes hard, and it adheres tenaciously to the surface on which it solidifies. Thus the method described by Pat. 3,063,817 is limited to the production of crystallized sulphur and requires a plurality of operational steps in which great care must be exercised to insure the recovery of crystallized sulphur.

In my copending application, Ser. No. 584,743, filed Oct. 6, 1966, there is disclosed a technique for solvent extraction which entails a dissolution zone wherein a hot mixture of a sulphur-bearing material and an organic solvent is maintained at a temperature sufficient to dissolve or agglomerate selectively the free sulphur in the ore, the organic solvent being one having a boiling point of about 300° F. The dissolution temperature particularly advantageous for carrying out this process may fall within the range of about 190° F. to below about 270° F. The solvent with the sulphur dissolved or agglomerated therein is then caused to move into a phase-separation zone of solvent maintained at a higher temperature at which sulphur is insoluble, thereby causing it to precipitate as a flowable liquid. The temperature in this zone may range from about 290° F. to below 400° F. However, I have found the range of about 290° F. to about 300° F. to be particularly advantageous because as the temperature approaches 300° F. and above, the precipitated sulphur becomes very viscous and is difficult to remove from the treating vessel. Thus, by maintaining the precipitation temperature within the preferred range stated hereinabove, sulphur in a flowable liquid condition is obtained which can be easily removed from the phase-separation zone, while the leached residue is being withdrawn from the dissolution zone.

The main object of the present invention is to provide a technique and system for the solvent extraction of sulphur which constitutes an improvement over the invention disclosed in said copending application, and which extracts elemental sulphur of high purity in a more efficient and economical manner.

Briefly stated, in a system in accordance with the invention, solid residue and sludge which are separated in the dissolution zone from the dissolved sulphur and which are intermingled with sulphur and solvent, are further processed to extract the sulphur and solvent, these being returned to the input of the system for recycling, so that the waste of sulphur and solvent is minimized. The sulphur solution from the dissolution zone is transferred to a sub-dissolution zone in which occluded sulphur is formed, the occluded sulphur being transferred to a phase-separation zone wherein elemental sulphur is precipitated.

For a better understanding of the invention as well as further objects and features thereof, reference is made to the following detailed description to be read in conjunction with the accompanying drawing, wherein the sole figure is a flow diagram of a preferred embodiment of a sulphur-extraction system in accordance with the invention.

Referring now to the drawing, sulphur-bearing ore or other material containing sulphur in a useful percentage, preferably higher than at least five percent, is fed into a grinder 10, which may be a ball mill or other standard mechanism to comminute the ore to yield a product which will pass through a screen 11 having a one-eighth inch to one-quarter inch mesh size. The comminuted ore in substantially the dry state is fed at ambient temperature into a storage hopper 12. The system disclosed herein may be employed in recovering elemental sulphur from sulphur-bearing ores, flue dust, smelter by-products and the like. For reasons of economy, I prefer treating sulphur-bearing ores containing at least 15% sulphur and ranging in sulphur content to about 35% by weight and higher.

The output of hopper 12 is combined with stove oil, kerosene, or other suitable low-carbon hydrocarbon solvent which has been preheated to about 290° F. and is introduced through inlet line 13.

The organic solvent employed should have the following temperature and chemical characteristics: it should, when heated, provide a low temperature range, e.g. about 160° F. to about 185° F. just below the melting point of sulphur at which sulphur is insoluble, an intermediate temperature range at which the sulphur is soluble in the solvent, e.g., about 190° F. to below 270° F.; and a higher temperature range substantially above the melting point of sulphur, at which the sulphur is insoluble, e.g., about 290° F. to below 400° F., and from which heated solvent the sulphur precipitates as a flowable liquid.

An example of an organic solvent having the foregoing characteristics is a kerosene fraction having a boiling point above about 300° F. Broadly speaking, the organic solvent may be an open chain hydrocarbon selected from aliphatic hydrocarbons of boiling points above 300° F., which include olefinic and paraffinic solvents and chlorinated derivatives thereof having up to 18 carbon atoms. Examples of paraffinic hydrocarbons are nonanes, decanes, undecanes, etc., while olenfinic solvents include nonenes, decenes, undecenes and so on up to 18 carbon atoms. Examples of specific solvents besides kerosene are diesel oil and stove oil. Chlorinated hydrocarbons of boiling point about 300° F. include 2-ethylhexyl chloride and 1,2,3-trichlorpropane.

The heated organic solvent intermingled with the ground ore forms a slurry which is conducted by a conveyor 14 into a storage tank 15. In practice, conveyor 14 may be of the screw type. The amount of solvent introduced is made sufficient to produce a hot flowable slurry, the ratio of solvent to ore being such that the mixture in the conveyor has an average temperature of about 160° F. to 170° F. or to just below the melting point of the sulphur. This ratio may range from 1 to 1, to about 1 to 5. Conveyor 14 constitutes a pre-heat zone to prepare the slurry for treatment in the succeeding dissolution zone.

Storage tank 15 is maintained, by means of a suitable heater device 16, at a uniform temperature at which the slurry therein is held between 190° F. and 200° F., within which intermediate temperature range the sulphur constituent in the slurry dissolves in the organic solvent, the residual solids or tailings settling at the bottom of the tank. Hence storage tank 15 constitutes the dissolution zone of the system.

These residual solids at the bottom of the tank 15 are intermixed with undissolved sulphur and solvent, and are drawn as a slurry into a flotation cell 17, where the slurry is treated with water at a temperature of about 200° F. introduced through line 18. Added to the water is a pine oil serving as a frother, and also a wetting agent, which may be a sulphonate, the organic solvent acting as a collector. Flotation effects separation of different substances by preferential wetting or non-wetting of the materials. This separation is accomplished by allowing the wetted material to sink and the non-wetted material to float off.

In flotation tank 17, the residual solids which settle on the bottom represent the ore residue virtually free of sulphur and solvent. These solids are pumped to a waste pile 19 for disposal. The solvent and sulphur constituents are contained in the froth rising above the residual solids in the flotation tank.

This froth is transferred to a settling tank 20 to effect a liquid-liquid separation, water being the bottom fraction and sulphur and solvent being the top fraction. The water is discharged into a pond 21, whereas the sulphur and solvent are transferred to a recycle reservoir 22. From this reservoir, the sulphur and solvent are returned to the input line 13 through a heat exchange device 23, for reprocessing. The reservoir 22 is preferably heated to the range of 190° F. to 220° F. to effect dissolution of the free sulphur in the solvent, whereas device 23 raises the temperature of the sulphur solution to about 290° F. which is the input temperature.

In storage tank 15, the sulphur is in solution, for the uniform temperature in this tank is within the sulphur dissolution range. This sulphur solution or pregnant liquor is fed through a succession of cyclones 24, centrifugal devices or mechanical filters which act to separate residual fine sludge from the liquor. This sludge is combined with the storage tank residue fed into flotation tank 17 for reprocessing. Alternatively, the fine sludge may be fed into input line 13 going into the leacher.

The cyclone overflow which is constituted by the purified pregnant liquor is then fed to a sub-dissolution stage 25 wherein the temperature of the liquor is reduced to a relatively low temperature of about 145° F., at which level sulphur is insoluble in the solvent and occluded sulphur is formed. Occluded sulphur is sulphur containing occluded solvent, the relative volume of solvent being as high as 60%. Occlusion is a condition of uniform molecular adhesion between a precipitate and a soluble substance of such a nature that it is very difficult to separate the occluded substance by washing or other simple mechanical process. Occlusion in precipitates depends upon the distribution of a substance between solvent and solid and is probably due to adsorption. The occluded sulphur is then transferred to a settling tank 26 where the stripped liquor is decanted off until this tank is almost filled with occluded sulphur, the stripped liquor being fed into the recycle reservoir.

When tank 26 is almost full, it is heated by a heater 27 to a relatively high level between 240° F. and 250° F., thereby melting the occluded sulphur and causing a two-phase separation, molten sulphur being the heavier fraction, and the previously occluded solvent being the lighter liquid fraction. The solvent is then decanted off and fed to recycle reservoir 22. The molten sulphur at the bottom of tank 27 is transferred to a filter 28 to remove impurities and then to a storage and shipping area 29.

In practice, steam is used as the heating medium, where required. Heat transfer is effected through shell and tube heat exchangers, but in the case of tanks requiring heating steam, coils are employed for this purpose. In the actual operation of the systems shown herein, sulphur having a purity of 99.5% has been obtained, with a recovery of approximately ninety-five percent and higher.

Thus in the system shown in the figure, storage tank 15 functions as the first zone in which the temperature of the solvent is at an intermediate level and gives rise to dissolution to form a pregnant liquor, cooling tank 25 functions as the second zone in which the temperature therein is at a sub-dissolution or low level to produce occluded sulphur, and settling tank 26 functions as the third zone in which the temperature is at a high level to effect phase-separation between the elemental sulphur and the occluded solvent.

While there has been shown a preferred embodiment of a system in accordance with the invention, it will be understood that many changes and modifications may be made therein without departing from the essential spirit of the invention as defined in the annexed claims.

What I claim is:

1. A system for solvent extraction of elemental sulphur from sulphur-bearing material, the system comprising:
   (a) storage means for said material,
   (b) a dissolution tank,
   (c) means to convey said material to an input means,
   (d) input means to intermingle a heated organic solvent and said material to form a slurry whose temperature is just below the dissolution temperature of the sulphur and to discharge said slurry into said dissolution tank,
   (e) means to heat the slurry in said dissolution tank to an extent raising its temperature to an intermediate level at which the sulphur constituent therein dissolves in said solvent to form a pregnant liquor as well as a residue having sulphur and solvent intermingled therewith, said residue settling at the bottom of the dissolution tank,
   (f) flotation means coupled to the bottom of said tank to draw said residue therefrom and to recover from said residue said sulphur and solvent, said flotation means including a flotation tank having an inlet for adding water and a frothing and wetting agent thereto to form a froth containing sulfur and solvent, said solvent functioning as a collector, and a froth outlet connecting with a froth settling tank,
   (g) recycling means to feed sulphur and solvent derived from said froth settling tank into said input means,
   (h) means to transfer said pregnant liquor from said dissolution tank into a second zone including cooling means to subject said pregnant liquor to a relatively low temperature above 100% F. but below the dissolution temperature of the sulphur to produce an occluded sulphur, (i) means to transfer said occluded sulphur to a third zone including means to heat the occluded sulphur to a temperature which is at a relatively high level above said intermediate level causing phase-separation between elemental sulphur and the occluded solvent but is below a level causing the solvent to vaporize, (j) means to withdraw said elemental sulphur from said phase-separation zone, and (k) means to return said solvent from said phase-separation zone to said input means.

2. A system as set forth in claim 2, wherein said dissolution tank is heated to maintain the slurry therein in a range of about 190° F. to 220° F.

3. A system as set forth in claim 2, wherein the pregnant liquor in said second zone is lowered to a temperature level of about 145° F.

4. A system as set forth in claim 2, wherein said organic solvent is fed into said input means at a temperature of about 270° F. whereby the resultant slurry is at a temperature of about 160° F. to 170° F.

5. A system as set forth in claim 2, wherein the pregnant liquor from the storage tank is fed into the second zone through a cyclone to remove sludge therefrom, said sludge being fed to said flotation means.

6. A system as set forth in claim 2, wherein said phase-separation zone incudes a settling tank, and means to heat the occluded sulphur derived from said second zone to a level of about 270° F. to 300° F.

7. A system as set forth in claim 2, wherein said sulphur-bearing material is an ore having at least 15% of sulphur by weight.

References Cited

UNITED STATES PATENTS

| 2,890,941 | 6/1959 | Bartlett | 23—312 X |
| 2,934,414 | 4/1960 | Bradley | 23—312 |
| 3,063,817 | 11/1962 | Simpson | 23—312 |
| 3,093,457 | 6/1963 | Kemp | 23—312 |

FOREIGN PATENTS

| 8,530 | 1905 | Great Britain. |

NORMAN YUDKOFF, Primary Examiner

S. J. EMERY, Assistant Examiner

U.S. Cl. X.R.

23—224, 229, 299, 308, 312